United States Patent
Yang et al.

(10) Patent No.: US 6,580,211 B1
(45) Date of Patent: Jun. 17, 2003

(54) TRIODE ASSEMBLY FOR CARBON COLD CATHODE

(75) Inventors: Mohshi Yang, Austin, TX (US); Leif Thuesen, Round Rock, TX (US); Richard Lee Fink, Austin, TX (US); Zvi Yaniv, Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 0 days.

(21) Appl. No.: 09/522,208

(22) Filed: Mar. 9, 2000

(51) Int. Cl.[7] .............................. H01J 1/62; H01J 63/04
(52) U.S. Cl. ...................... 313/495; 313/310; 313/496; 445/24
(58) Field of Search .......................... 313/495, 496, 313/497, 309, 336, 351, 310; 445/24

(56) References Cited

U.S. PATENT DOCUMENTS

| | | | |
|---|---|---|---|
| 5,548,185 A | * 8/1996 | Kumar et al. ............... 313/495 |
| 5,717,278 A | * 2/1998 | Bartha et al. ............... 313/336 |
| 5,763,997 A | * 6/1998 | Kumar ....................... 313/495 |
| 5,986,388 A | * 11/1999 | Makishima .................. 313/309 |
| 6,204,597 B1 | * 3/2001 | Xie et al. .................... 313/310 |

* cited by examiner

*Primary Examiner*—Vip Patel
*Assistant Examiner*—Joseph Williams
(74) *Attorney, Agent, or Firm*—Kelly K. Kordzik; Winstead Sechrest & Minick P.C.

(57) ABSTRACT

A triode structure code cathode assembly is produced by depositing a carbon emitter material onto a substrate to form a cathode structure. Then, an insulating layer is deposited onto one side of a mesh foil to form a mesh assembly. This mesh assembly is then mechanically attached to the cathode structure so that the insulating layer on the one side of the mesh assembly is contacting the cathode structure. This entire triode cathode assembly can then be used to produce a field emission display device by including an anode structure.

15 Claims, 7 Drawing Sheets

TRIODE ASSEMBLY FOR CARBON COLD CATHODE

TECHNICAL FIELD

The present invention relates in general to data processing systems, and in particular, to a triode assembly for a cold cathode field emission device.

BACKGROUND INFORMATION

Carbon-based cold cathodes are relatively flat substrates on which a carbon film is deposited. If the carbon film is deposited with the correct parameters, this film will emit electrons when the surface of the cathode is subjected to an electric field that is normal to the carbon film surface. These electric fields are generally on the order of 3–10 volts/micron for current densities of 1–10 $mA/cm^2$. For many applications, the average current density must be controlled very accurately and very rapidly. This requires rapid control of the field that is applied. The field is applied by switching a voltage across a gap between the cathode and another electrode. The smaller the gap between the cathode and the switching electrode, the smaller the voltage required to switch the emission properties of the cathode on and off. Small switching voltages allow cheaper and more efficient drivers that are needed to switch the voltages on the device.

A typical configuration for a display device is to have three electrodes: a cathode, and anode, and a grid. The grid electrode is typically the switching electrode for switching the current from the cathode on and off.

For Spindt-type microtip technology, the cathode and grid electrodes are integrated on the same substrate. Both the tip and the electrode are engineered so the electron source (top of the tip) is placed very precisely in the grid opening. This self-aligned process optimizes the performance of the grid and cathode electrodes, allowing the grid electrode to operate at nearly 100 percent efficiency. For a non-engineered cathode, such as carbon cold cathodes, the electron sources (emission sites) are randomly placed on the cathode. Thus, to make a triode assembly using a carbon cold cathode, engineers have resorted to two techniques, neither of which is ideal.

The first technique, referring to FIG. 1, a carbon cold cathode is produced first by depositing an emitter 102 on a substrate 101. Then a grid electrode 104 is mounted to the cathode 101 with spacers 103 between the grid 104 and the cathode 101, such that the grid electrode 104 is suspended over the active carbon areas 102 of the cathode 101. The grid 104 is a perforated metal foil. If conducting spacers are used, they must be placed on an insulating part of the cathode. Even if insulating spacers are used, they must be placed carefully in order to avoid charge up and arcing between the cathode and the grid. Generally, this approach leads to large gaps between the cathode and the grid electrode, which means that the driving voltages tend to be high. Furthermore, this approach is not very efficient since a large percentage, 50% or higher, of the electron current from the cathode can go to the grid electrode. This warms the grid electrode unnecessarily, which decreases the device efficiency and may also lead to mechanical difficulty in operating the device.

In a second technique, referring to FIGS. 2A, 2B and 2C, a cathode/grid integrated grid structure is first produced on a single substrate, then a carbon film 205 is grown thereon. For example, in FIGS. 2A and 2B, a substrate 201 has deposited and patterned thereon an insulating layer 202 and a metal layer 203, which acts as the grid layer. Holes 204 are thus formed within the grid layers. Thereafter, in FIG. 2C, a carbon film 205 is deposited on the entire structure, so that the carbon material 205 not only deposits within the holes 204, but also on the sidewalls and on the top of the grid structure, thus potentially compromising the structure and making it inoperable, as described below.

Generally, it has not been possible to make an integrated cathode/grid assembly after the carbon film has been deposited since the processes that are used to make the structure severely degrade the performance of the carbon film. Making the structure first and then depositing the carbon film, as illustrated in FIGS. 2A–2C, also has problems. The structure must survive the high temperatures and extremely reactive environments needed for carbon deposition. Generally, this leads to structure failure, either because the structure physically falls apart, or because the insulating layer 202 used between the cathode layer 201 and the grid layer 203 becomes conductive as a result of exposure to the extreme environments.

As a result of the foregoing, there is needed in the art an improved triode assembly for a carbon cold cathode.

SUMMARY OF THE INVENTION

The present invention addresses the foregoing needs by providing for a grid assembly that includes a conducting layer and an insulating layer that is then placed directly onto a carbon cathode. The carbon cathode is prepared separately from the grid assembly so the grid assembly is not exposed to the extreme environment required to make the carbon cathode. In this approach, an insulating layer is placed on a conducting foil. It is also possible to place a conducting layer on an insulating foil and achieve the same result. The insulating and conducting layer are then placed directly onto the cathode and bonded to the cathode using adhesives.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
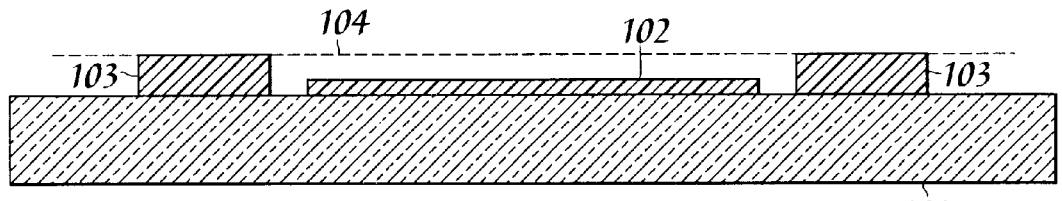
FIGS. 1, 2A, 2B and 2C illustrate prior art cold cathode assemblies.
Figure 2A:
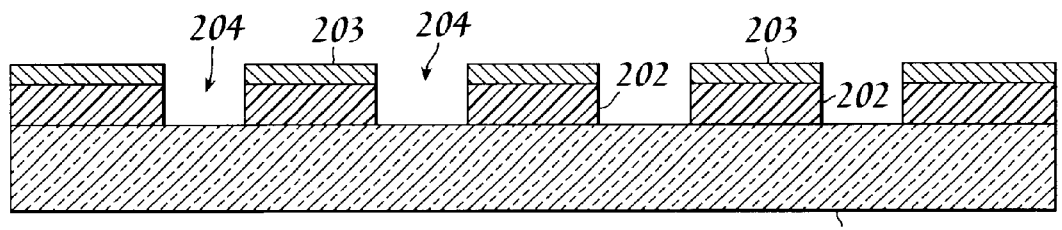
Figure 2B:
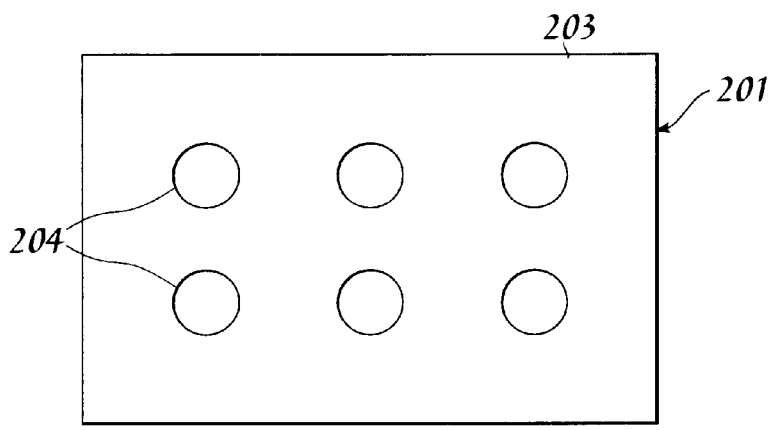
Figure 2C:
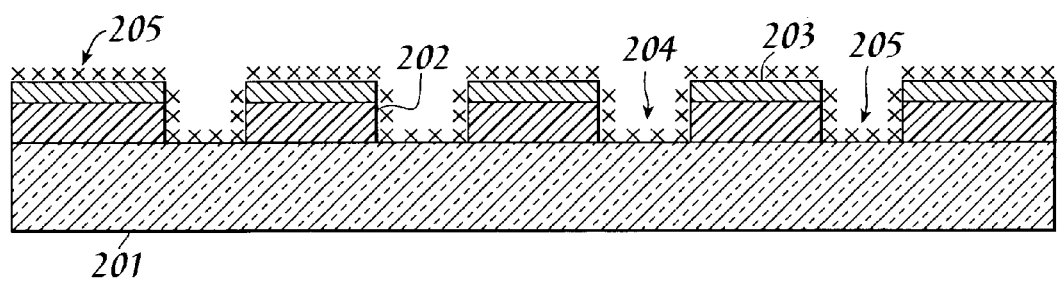

In the following description, numerous specific details are set forth such as specific voltages and deposition on techniques, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 3:
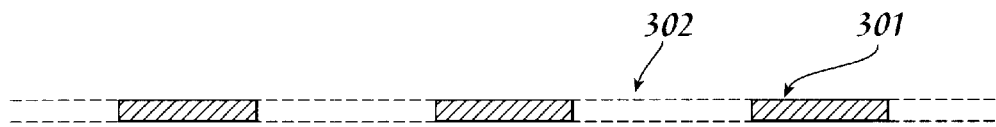
FIG. 3 illustrates a side view of a conductive grid used within an embodiment of the present invention.
Figure 4:
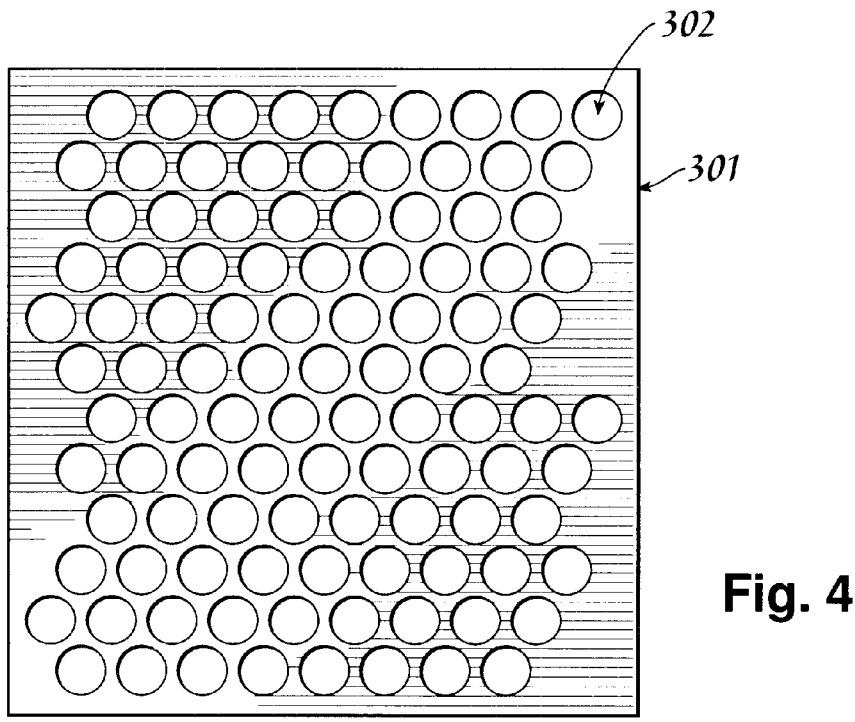
FIG. 4 illustrates a top view of the grid illustrated in FIG. 3.

Referring to FIG. 3, there is illustrated a side view of a metal mesh material 301 having holes 302 formed there through. FIG. 4 illustrates a top view of such a metal mesh 301. By way of example, but not meant to in any way be limiting upon the claims of the present invention, the wire spacing of the mesh 301 between holes 302 may be 12 micrometers, while each hole 302 may be 50 micrometers in diameter. The mesh 301 may be of any physical configuration, including perforated and porous.

Figure 5:
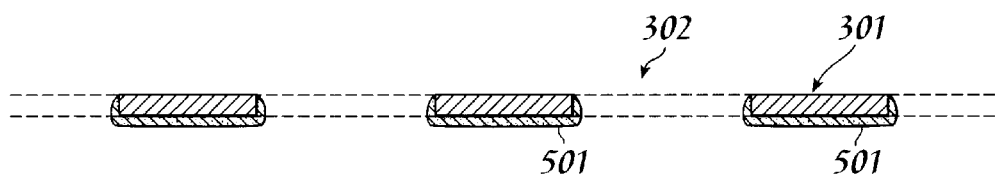
FIG. 5 illustrates deposition of an insulating layer on the grid in accordance with an embodiment of the present invention.
Figure 7:
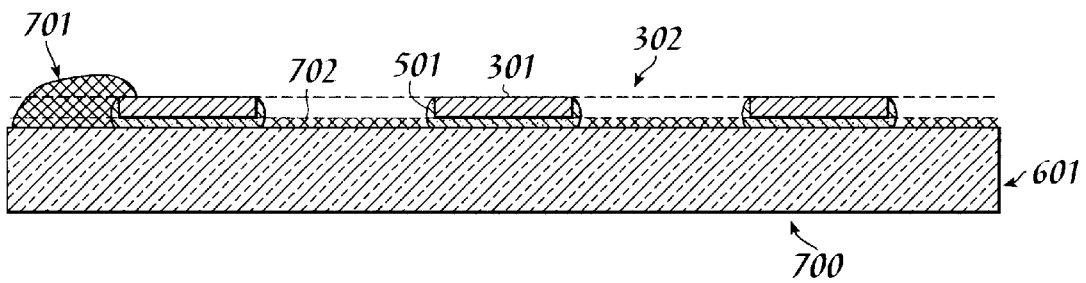
FIG. 7 illustrates a side view of a triode assembly in accordance with an embodiment of the present invention.

FIG. 5 illustrates a next step in a process for producing the triode assembly of the present invention whereby a 2-micrometer silicon dioxide film 501 is deposited on one side and the edges of mesh 301 by one of many techniques, such as plasma enhanced (PE) chemical vapor deposition (CVD). If necessary, excess silicon dioxide may be etched away on one side of mesh 301. Note that other insulators, and other deposition techniques may also be used to produce the structure illustrated in FIG. 5. Note that other insulating materials may also be utilized instead of silicon dioxide, such as polyimide, plastics, quartz, glass, ceramics such as alumina, forsterite, and minerals such as mica.

Also further note that the structure in FIG. 5 may be produced by depositing a conducting layer onto a mesh foil that is insulating to achieve the same result.

Figure 6:
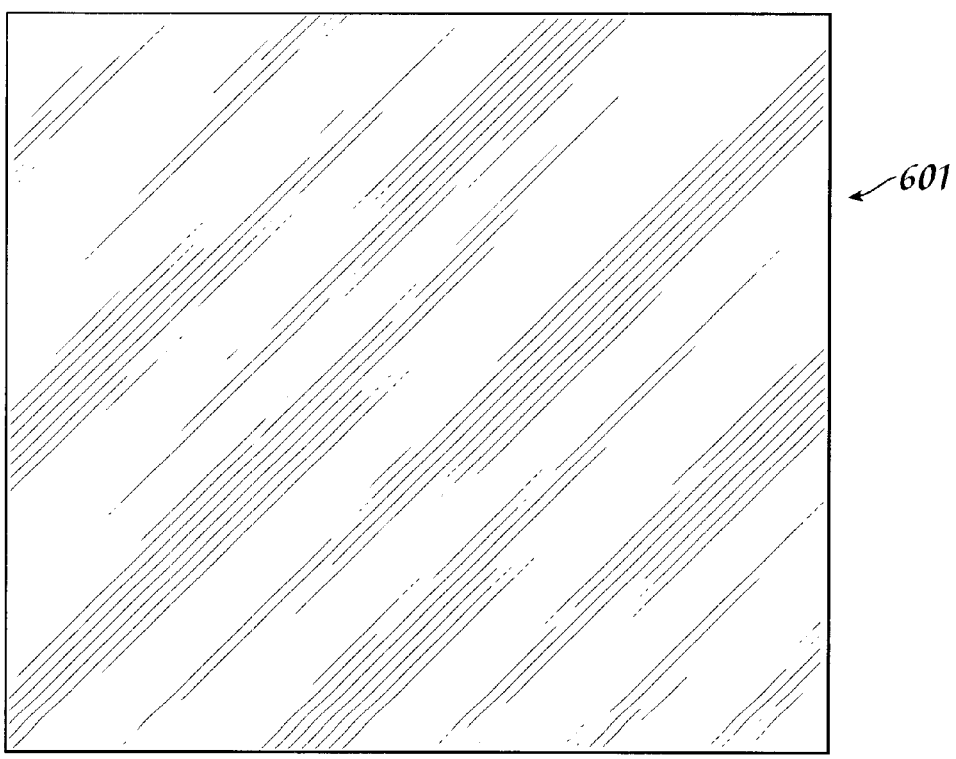
FIG. 6 illustrates a cathode structure used within an embodiment of the present invention.
Figure 9:
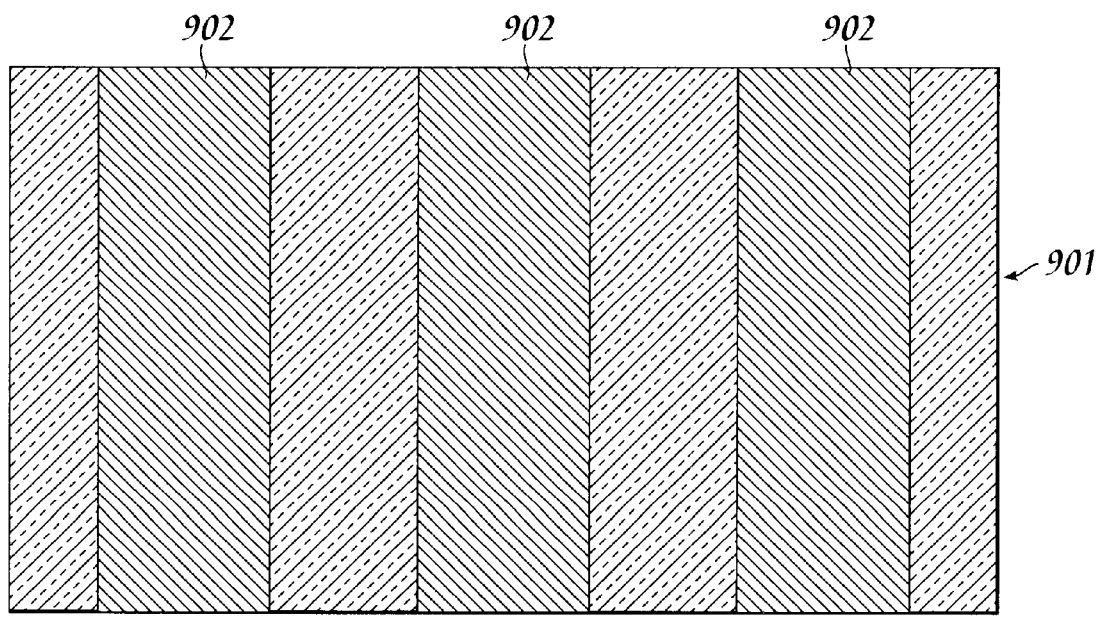
FIG. 9 illustrates an alternative cathode assembly used within an embodiment of the present invention.

FIG. 6 illustrates a top view of a cathode substrate before attaching the mesh grid 301 of FIG. 5. It should be also noted that a patterned cathode structure 901, as illustrated in FIG. 9, may be alternatively utilized, whereby a pattern such as parallel metal lines 902 have been formed on the cathode structure 901, with an emitting material, such as a carbon film, deposited thereon, Nevertheless, the carbon film 702 is deposited on the cathode substrate 601 prior to mechanically placing the mesh assembly 301 of FIG. 5 directly onto the cathode 601 surface. Depositing includes any process for placing the emitter material onto the substrate, including but not limited to coating, dipping, painting, printing, spraying, physical vapor deposition techniques, such as thermal and e-beam evaporation, sputtering, pulse laser deposition, conformal coating, knife coating, spin coating, pouring, plating, chemical vapor deposition, and anodization. A bonding adhesive 701 may be used to bond the mesh assembly 301 onto the cathode substrate 601 to produce the cathode assembly 700. Bonding includes but is not limited to UV curable bonding, gluing, fritting, heat sealing, epoxy, adhesives, anisotropic conducting film, tape, adhesive tape, and thermal curable bonding material.

Figure 13:
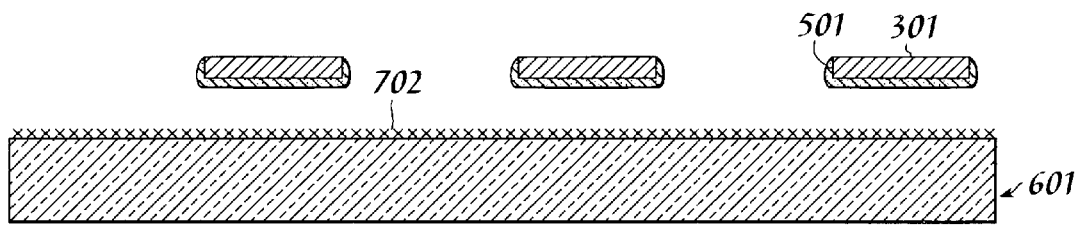
FIG. 13 illustrates an alternative embodiment of the present invention.

In an alternative embodiment of the present invention, the individually constructed grid and cathode assemblies can be joined without contact between each other by affixing the grid assembly a predetermined distance apart from the cathode assembly, as illustrated in FIG. 13. In such an instance, a bonding material and a spacer material may be utilized to affix the grid assembly to the cathode assembly, such as glass beads, glass fibers, plastic beads or fibers, and metal or insulating balls or pedestals.

Figure 8:
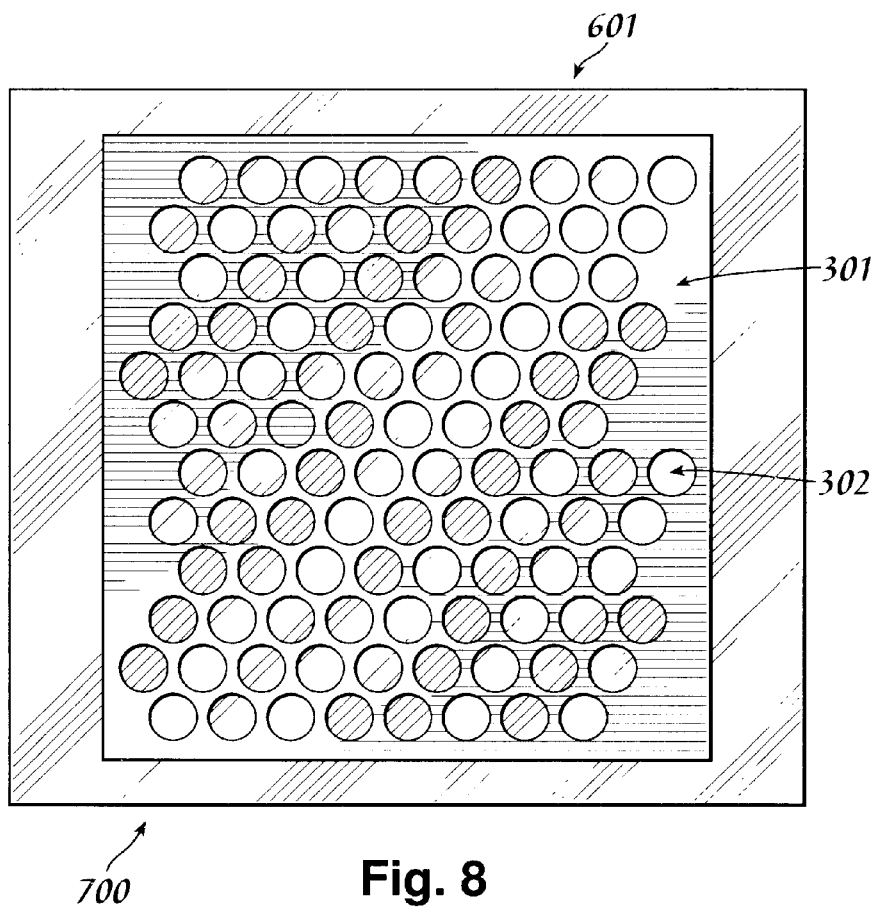
FIG. 8 illustrates a top view of the triode assembly illustrated in FIG. 7.
Figure 10:
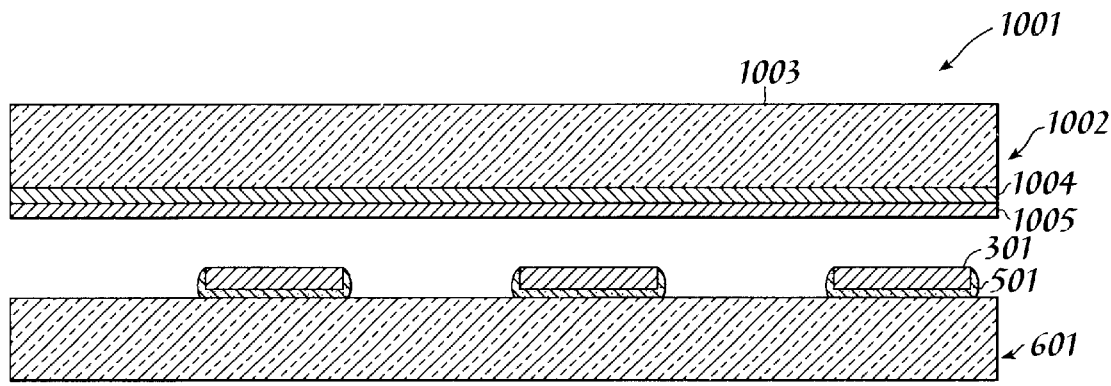
FIG. 10 illustrates a display device configured in accordance with the present invention.

FIG. 8 illustrates a top view of the cathode assembly 700. FIG. 10 illustrates combining the cathode assembly 700 of the present invention with an anode 1002 having a glass substrate 1003, a conductive layer 1004, and a phosphor material 1005 in order to produce a display device 1001 capable of emitting photons from the phosphor material in response to bombardment by electrons from the cathode assembly 700.

Figure 11:
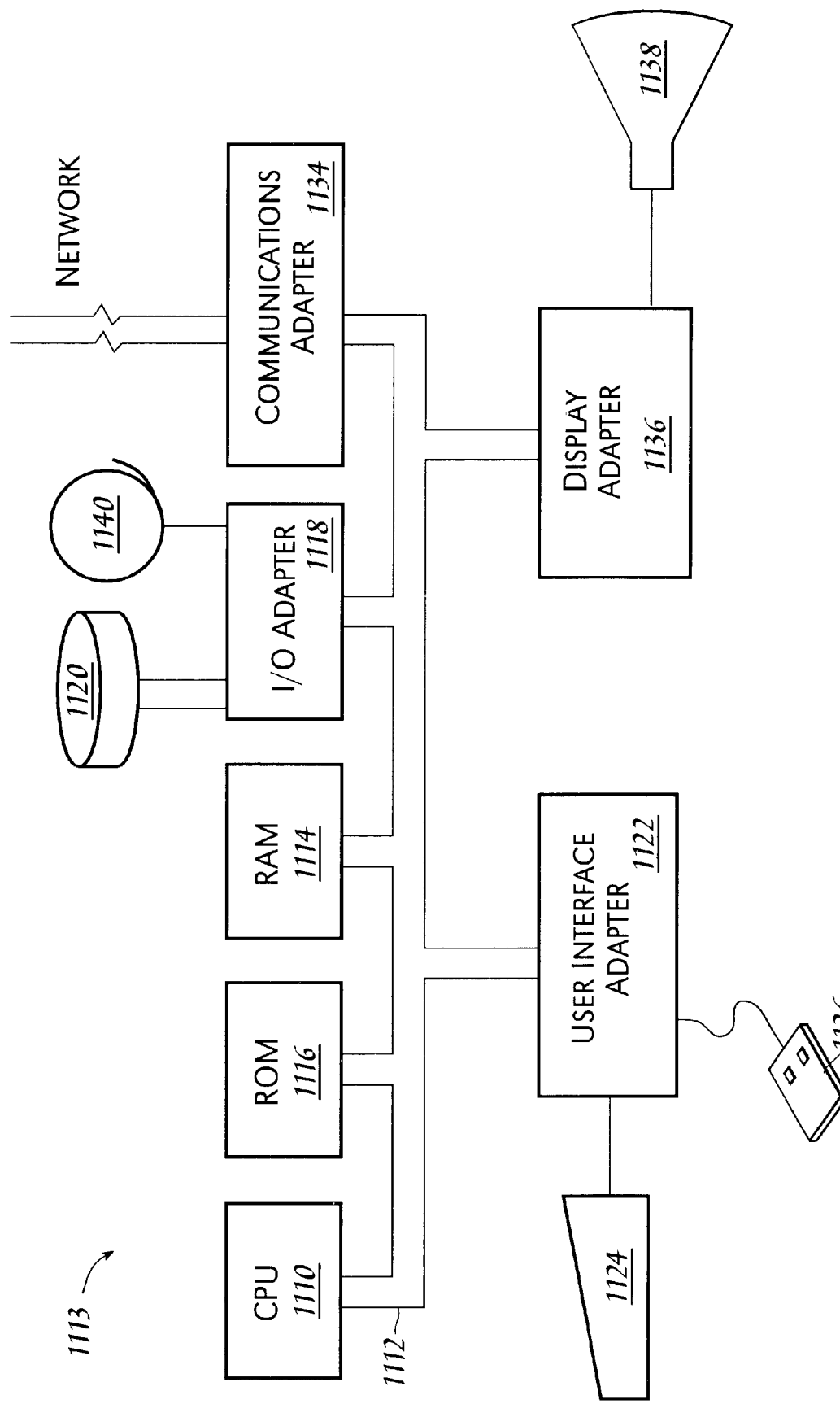
FIG. 11 illustrates a data processing system configured in accordance with the present invention.

Referring to FIG. 11, a display device, such as display device 1001 in FIG. 10, can be used to produce the display 1138, within data processing system 1113. FIG. 11 illustrates a typical hardware configuration of data processing system 1113 in accordance with the subject invention having central processing unit (CPU) 1110, such as a conventional microprocessor, and a number of other units interconnected via system bus 1112. Data processing system 1113 includes random access memory (RAM) 1114, read only memory (ROM) 1116, and input/output (I/O) adapter 1118 for connecting peripheral devices such as disk units 1120 and tape drives 1140 to bus 1112, user interface adapter 1122 for connecting keyboard 1124, mouse 1126, and/or other user interface devices such as a touch screen device (not shown) to bus 1112, communication adapter 1134 for connecting data processing system 1113 to a data processing network, and display adapter 1136 for connecting bus 1112 to display device 1138. CPU 1110 may include other circuitry not shown herein, which will include circuitry commonly found within a microprocessor, e.g., execution unit, bus interface unit, arithmetic logic unit, etc.

The triode assembly cathode structure described above has been demonstrated to produce a significantly bright emission of photons in response to bombardment of electrons from the cathode assembly. In a demonstration of the viability of a triode assembly in accordance with the present invention, a nickel metal mesh was coated with approximately two microns of silicon dioxide, deposited by a plasma enhanced CVD technique. The material was then etched on one side in a reactive ion etcher to remove the silicon dioxide material on one side of the mesh. This is because the plasma enhanced CVD technique coated both the top and bottom of the mesh with silicon dioxide, which was not desirable in this example. It was desired to have a metal layer exposed on one side of the mesh assembly. If the conducting layer was completely enclosed in an insulating layer, then an undetermined amount of the electric field will be dropped across this insulating layer. This is what keeps the conducting grid layer from shorting to the conducting film on the cathode. With the grid completely enclosed in an insulating layer, there is no grid surface on which the electric field can be controlled as applied to the cathode. All of the field strength would be dropped across the insulator. On the other hand, the metal surface does not have to be completely exposed. A resistive layer may work as well, as long as the resistance is not so high that it drops most of the field strength across this layer and not across the vacuum gap between this surface and the active cathode surface. A thinner layer of silicon dioxide (e.g., 500 angstroms) may be sufficient, or a thicker layer but of poor insulating quality may also work.

Figure 12:
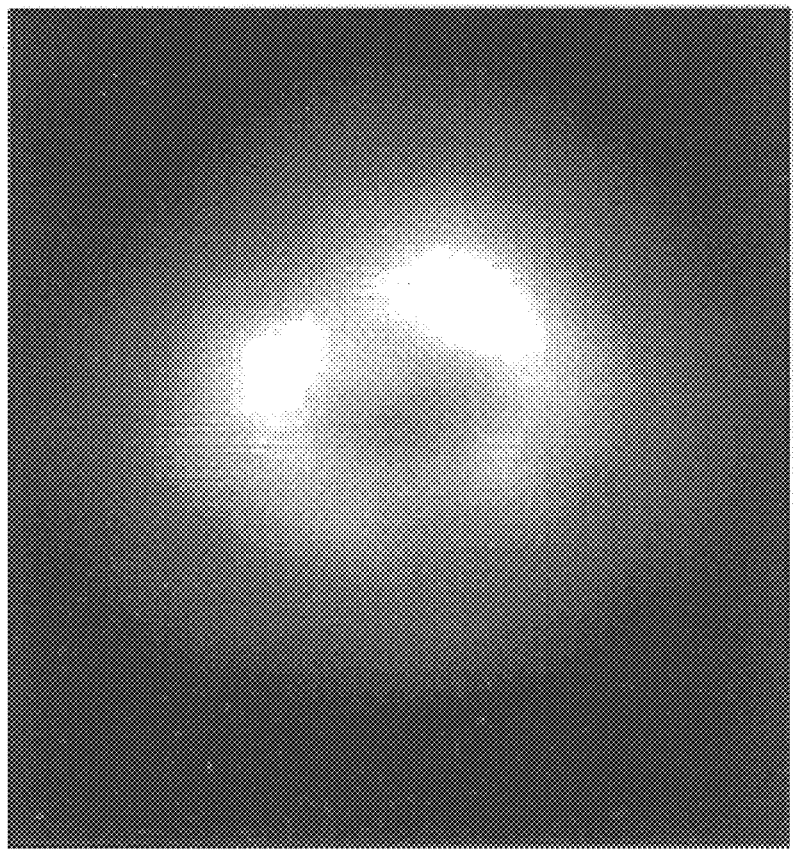
FIG. 12 illustrates an image (in a digital photo) formed on an anode as a result of electrons extracted from a cathode assembly configured in accordance with the present invention.

The mesh assembly was then physically attached to a carbon cathode already prepared using a hot filament CVD process. The mesh was attached to the carbon cathode such that the insulating layer of the mesh was contacting the carbon cathode. A bias of 100–150 volts was placed between the conducting layer of the mesh and the carbon cathode surface, such that electrons were extracted from the carbon film through the perforations in the grid and to an anode biased at 5000 volts. The biAs between the grid and cathode controlled the extraction current. The image formed on the anode from the extracted electrons is illustrated in the digital image of FIG. 12.

Although the present invention and its advantages have been described in detail, it should be understood that various changes, substitutions and alterations can be made herein without departing from the spirit and scope of the invention as defined by the appended claims.

What is claimed is:

1. A field emission display device comprising:
   a cathode assembly comprising:
      a grid assembly produced by depositing an insulating layer onto a conductor, the conductor having a top side and a bottom side, wherein the insulating layer covers substantially all of the bottom side of the conductor;
      a cathode structure produced by depositing an emitter material onto a substrate,
      wherein the grid assembly is then placed onto the cathode structure so that the insulating layer contacts the cathode structure in a manner so that the conductor side of the grid assembly does not face the emitter material;
      an anode assembly including a substrate and a phosphor for emitting photons in response to bombardment by electrons from the cathode assembly; and
      a bonding material for bonding the grid assembly to the cathode structure.

2. A data processing system comprising:
   a processor;
   an input device;
   a memory device;
   a display device; and
   a bus system coupling the processor to the input device, the memory device, and display device, wherein the display device further comprises:
      a cathode assembly comprising:
         a grid assembly produced by depositing an insulating layer onto a patterned conductor, the conductor having a top side and a bottom side, wherein the insulating layer covers substantially all of the bottom side of the conductor; and
         a cathode structure produced by depositing an emitter material onto a substrate,
         wherein the grid assembly is then placed onto the cathode structure so that the insulating layer contacts the cathode structure and the patterned conductor does not face the emitter material, and
         an anode assembly including a substrate and a phosphor for emitting photons in response to bombardment by electrons from the cathode assembly.

3. A cold cathode comprising:
   a grid assembly produced by depositing a conducting layer on substantially an entire side of a patterned insulator; and
   a cathode structure produced by depositing an emitter material onto a substrate,
   wherein the grid assembly is then placed onto the cathode structure so that the insulator contacts the cathode structure and no part of the conducting layer faces the emitter material.

4. The cold cathode as recited in claim 3, wherein the conducting layer does not contact the cathode structure.

5. A method for making a cold cathode comprising the steps of:
   making a grid assembly by providing a grid structure and depositing a material on the grid structure so that the grid assembly has a conducting side and an insulating side;
   making a cathode assembly by depositing a field emitter material onto a substrate; and
   placing the grid assembly onto the cathode assembly so that the insulating side contacts the cathode assembly and the conducting side does not face the field emitter material.

6. The method as recited in claim 5, wherein the conducting side of the grid assembly does not contact the cathode assembly.

7. The method as recited in claim 6, wherein the insulating side contacts the field emitter material.

8. The method as recited in claim 7, wherein the grid assembly and the cathode assembly are produced separately.

9. The method as recited in claim 7, wherein the grid assembly is produced by depositing an insulator material onto a patterned conductor, wherein the insulator material separates the patterned conductor from the cathode assembly when the grid assembly is placed onto the cathode assembly.

10. The method as recited in claim 9, further comprising the step of:
    etching the grid assembly so that the insulator material resides only on one side and edges of the patterned conductor.

11. The method as recited in claim 7, wherein the grid assembly is produced by depositing a conducting material onto a patterned insulator, wherein the patterned insulator separates the conducting material from the cathode assembly when the grid assembly is placed onto the cathode assembly.

12. A method for making a cold cathode comprising the steps of:
    making a grid assembly by providing a grid structure and depositing a material on the grid structure so that the grid assembly has a conducting side and an insulating side;
    making a cathode assembly by depositing a field emitter material onto a substrate, wherein the grid assembly and the cathode assembly are produced separately; and
    placing the grid assembly a predetermined distance away from the cathode assembly so that the conducting side does not face the field emitter.

13. A cold cathode comprising:
    a grid assembly having a top side and a bottom side, wherein substantially all of the bottom side is covered with an insulating layer; and
    a cathode structure produced by depositing an emitter material onto a substrate, wherein the grid assembly is then placed onto the cathode structure so that the insulating layer contacts the cathode structure, wherein the grid assembly is a plate with perforations therethrough, wherein the insulating layer covers the bottom side of the grid assembly between the perforations.

14. A cold cathode comprising:

a grid assembly having a top side and a bottom side, wherein substantially all of the bottom side is covered with an insulating layer; and a cathode structure produced by depositing an emitter material onto a substrate, wherein the grid assembly is then placed onto the cathode structure so that the insulating layer contacts the cathode structure and so that only the insulating layer faces the emitter material.

15. A field emission display device comprising:

a cathode assembly comprising:

a grid assembly produced by depositing an insulating layer onto a conductor, the conductor having a top side and a bottom side, wherein the insulating layer covers substantially all of the bottom side of the conductor;

a cathode structure produced by depositing an emitter material onto a substrate, wherein the grid assembly is then placed onto the cathode structure so that the insulating layer contacts the cathode structure in a manner so that the conductor side of the grid assembly does not face the emitter material; and an anode assembly including a substrate and a phosphor for emitting photons in response to bombardment by electrons from the cathode assembly, wherein the grid assembly is a plate with perforations therethrough, wherein the insulating layer covers a bottom side of the grid assembly between the perforations.

* * * * *